United States Patent
Tojima (12) 
(10) Patent No.: US 6,223,336 B1
(45) Date of Patent: *Apr. 24, 2001

(54) MULTITASKING COMPUTER SYSTEM HAVING A BOOT PROCESS REWRITE PROGRAM

(75) Inventor: Mitsuhiro Tojima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/390,700

(22) Filed: Sep. 7, 1999

Related U.S. Application Data (63) Continuation of application No. 08/888,931, filed on Jul. 7, 1997, now Pat. No. 6,018,629.

(30) Foreign Application Priority Data

Jul. 5, 1996 (JP) .................................................. 8-195296

(51) Int. Cl.[7] .................................................. G06F 9/45
(52) U.S. Cl. .................................. 717/1; 714/2; 714/15
(58) Field of Search ............................ 717/11, 1; 714/2, 714/15

(56) References Cited

U.S. PATENT DOCUMENTS

| | | | |
|---|---|---|---|
| 5,315,711 | 5/1994 | Barone et al. ................. | 395/200.38 |
| 5,388,267 | 2/1995 | Chan et al. ................... | 395/652 |
| 5,432,927 | 7/1995 | Grote et al. .................. | 395/652 |
| 5,732,268 | 3/1998 | Bizzarri ....................... | 395/652 |

FOREIGN PATENT DOCUMENTS

| | | |
|---|---|---|
| 6-259242 * | 9/1994 | (JP) . |
| 6-324857 | 11/1994 | (JP) . |

OTHER PUBLICATIONS

Borg et al., Fault Tolerance Under UNIX, ACM Transactions on Computer Systems, vol. 7, No. 1, Feb. 1988, pp. 1–24.

Satyanarayanan, Integrating Security in a Large Distributed System, ACM Transactions on Computer Systems, vol. 7, No. 3, (1989), pp. 247–280.

* cited by examiner

Primary Examiner—Mark R. Powell
Assistant Examiner—Wei Zhen
(74) Attorney, Agent, or Firm—Foley & Lardner (57) ABSTRACT

A computer system that can rewrite a boot process program during operation, comprising at least two planes of non-volatile memory devices that are rewritable by software, a non-volatile memory device selector for switching at least the two planes of non-volatile memory devices, a multitasking operation system that can operate plural tasks, a boot process program rewrite program for operating as one task on the multitasking operating system and rewriting boot process programs written in the non-volatile memory devices, and a register with latch function for holding a rewrite state of each of the boot process programs written in at least the two planes of non-volatile memory devices.

6 Claims, 7 Drawing Sheets

MULTITASKING COMPUTER SYSTEM HAVING A BOOT PROCESS REWRITE PROGRAM

This application is a continuation of application Ser. No. 08/888,931, filed Jul. 7, 1997 now U.S. Pat. No. 6,018,629.

BACKGROUND OF THE INVENTION

The present invention relates to a computer system, and more particularly to an art of a computer system that can rewrite a boot process program (referred to as a BOOT process program, hereinafter) in service by remote control.

Conventionally, in a computer system of that type, rewriting the content of a boot process program is generally made by first opening the cabinet of the computer system and then replacing the ROM to which the BOOT process program is written.

Figure 6:
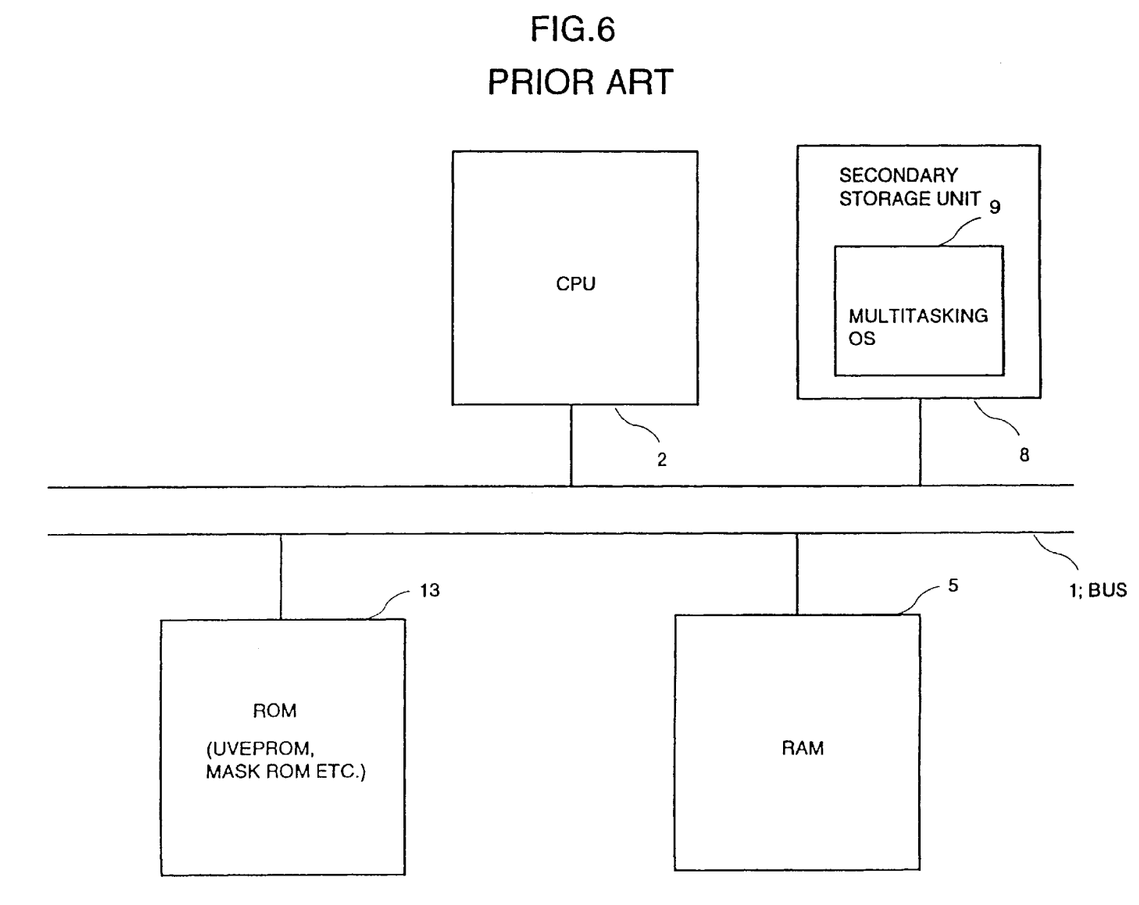
FIG. 6 is a block diagram illustrating the configuration of a conventional computer system.

FIG. 6 illustrates the configuration of a conventional computer system. Referring to FIG. 6, a conventional computer system includes a bus 1 necessary for operation of the computer system, a CPU 2, a secondary storage unit 8, a multitasking operation system (OS) 9 stored on the secondary storage unit 8, a RAM 5, and a ROM 13 such as a UVEPROM (Ultra-Violet Erasable Programmable ROM) or mask ROM 13.

Figure 7:
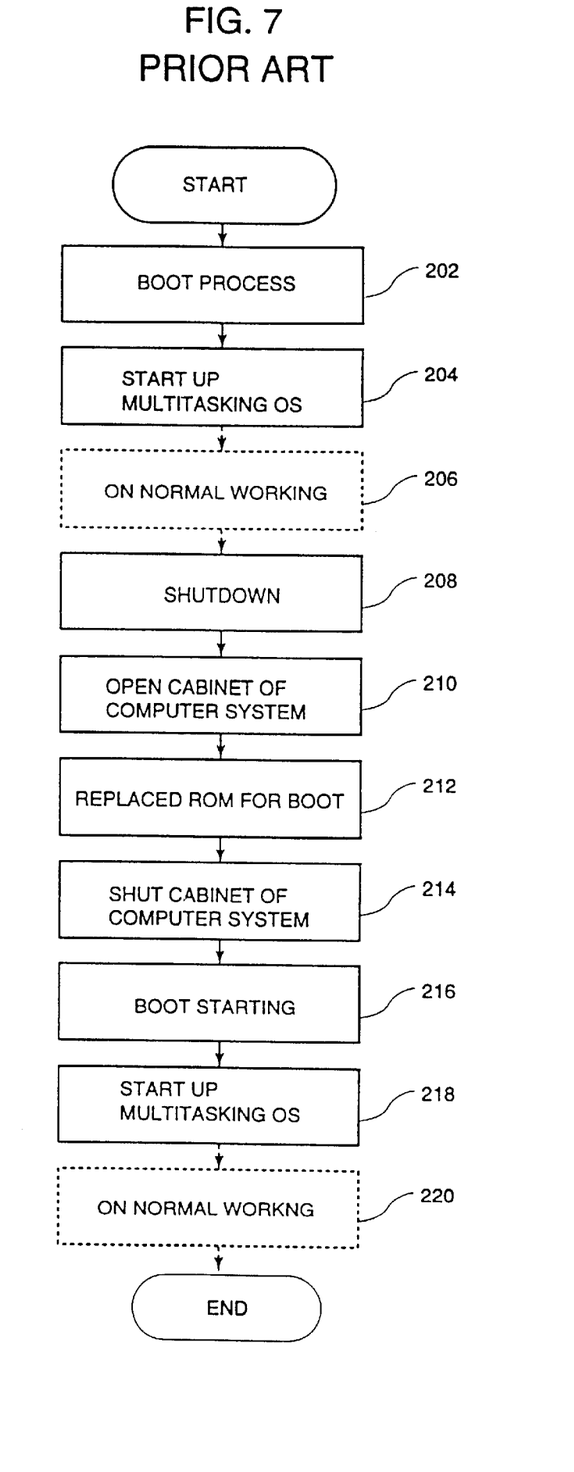
FIG. 7 is a flow chart showing the sequence ranging from a system set-up to re-operation after a replacement by a ROM, in a conventional computer system.

FIG. 7 is a flowchart showing the sequence ranging from a system start-up to re-operation after replacement with the ROM 13 in the conventional computer system.

Referring to FIGS. 6 and 7, first, the computer system starts up according to a BOOT process program written in the ROM 13 (step 202). Thereafter, the multitasking OS 9 stored in the secondary storage unit 8 is loaded onto the RAM 5 and started up (step 204). In the following steps, the computer system executes in normal working conditions (step 206).

To rewrite the BOOT process program, the cabinet of the computer system is opened (step 210) after shutdown of the computer system (step 208). Then, the ROM 13 mounted for BOOT operation is replaced by a ROM in which a new BOOT process program is written (step 212).

The cabinet of the computer system is closed (step 214). Then, the computer system is started up using the BOOT process program written in the new ROM 13 (step 216). Thereafter, the multitasking OS 9 stored on the secondary storage unit 8 is loaded onto the ROM 5 and restarted (step 218). In the following steps, the computer system executes processes in normal working conditions (step 220).

In another method of rewriting the content of a BOOT process program in that type of computer, JP-A-324857/1994, for example, proposes that a rewritable non-volatile memory device is used for the BOOT process program. This method, however, requires to carry the secondary storage medium such as a rewrite processing memory device or flexible disk to the site where the computer system exists. Hence, the BOOT process program must be rewritten only at the place where the computer system exists.

JP-A-259242/1994, for example, proposes a method that a BOOT process program written in a non-volatile memory device can be corrected while it is incorporated in a unit. However, this method cannot amend the BOOT process program if rewrite information is previously stored into the secondary storage medium in the computer system.

Any one of the foregoing prior arts has the problem that a maintenance crew must go to the site where the computer system exists and operate the computer system to rewrite the BOOT process program.

The reason is that BOOT process program rewrite information cannot be supplied if it is not loaded to the computer system. For example, in the prior art shown in FIG. 6, the cabinet of the computer system must be opened to exchange the ROM for a new one. In the prior art disclosed in JP-A-324857/1994, a secondary storage medium such as a memory device or flexible disk must be mounted. Furthermore, the prior art disclosed in JP-A-259242/1994 can remotely execute the rewrite operation, but a maintenance crew must go to the site where the computer system exists to rewrite previous rewrite information into the secondary storage medium.

SUMMARY OF THE INVENTION

The objective of the present invention is to solve the above-mentioned tasks. The objective of the invention is to provide a computer system that can rewrite a BOOT process program without suspending the computer system and without opening the cabinet of the computer system even if a bug is found in the BOOT process program.

Moreover, the objective of the invention is to provide a computer system that can rewrite a BOOT process program while an ordinary user is operating the computer system.

Furthermore, the objective of the present invention is to provide a computer system that can remotely rewrite a BOOT process program by transferring BOOT process program rewrite information to the secondary storage unit in the computer system via a communication line even if a maintenance crew does not go to the site where the computer system is installed.

Still furthermore, the objective of the present invention is to provide a computer system that can set up a computer system normally by resuming power supply even if a power supply should fail during a BOOT process program rewriting operation.

The objectives of the present invention are achieved by the computer system that can rewrite a boot process program during operation, comprising at least two planes of non-volatile memory devices that are rewritable by software, a non-volatile memory device selector for switching at least the two planes of non-volatile memory devices, a multitasking operation system that can operate plural tasks, a boot process program rewrite program for operating as one task on the multitasking operating system and rewriting boot process programs written in the non-volatile memory devices, and a register with a latch function for holding a rewrite state of each of the boot process programs written in at least the two planes of non-volatile memory devices.

The computer system further comprises an input/output device for connecting via a remote maintenance terminal and a communication line, and a file transfer protocol for transferring rewrite information of the boot process program via the communication line, wherein the boot process program can be remotely rewritten on working.

In the computer system, the register with latch function has at least two pieces of information including a flag indicating that a memory primary device module is being rewritten (hereinafter referred to as a primary module rewriting flag) and a flag indicating that a standby memory device is being rewritten (hereinafter referred to as a standby module rewriting flag), and is rewritable in flag units by software, and is directly connected to a signal line in hardware to execute automatic discrimination when the non-volatile memory device selector is powered on.

As described above, according to the present invention, the computer system includes a software rewritable non-volatile memory device (4 in FIG. 4) as a memory device that stores a BOOT process program. Thus, the BOOT process program can be rewritten without sustaining the computer system or opening the cabinet of the computer system.

Figure 1:
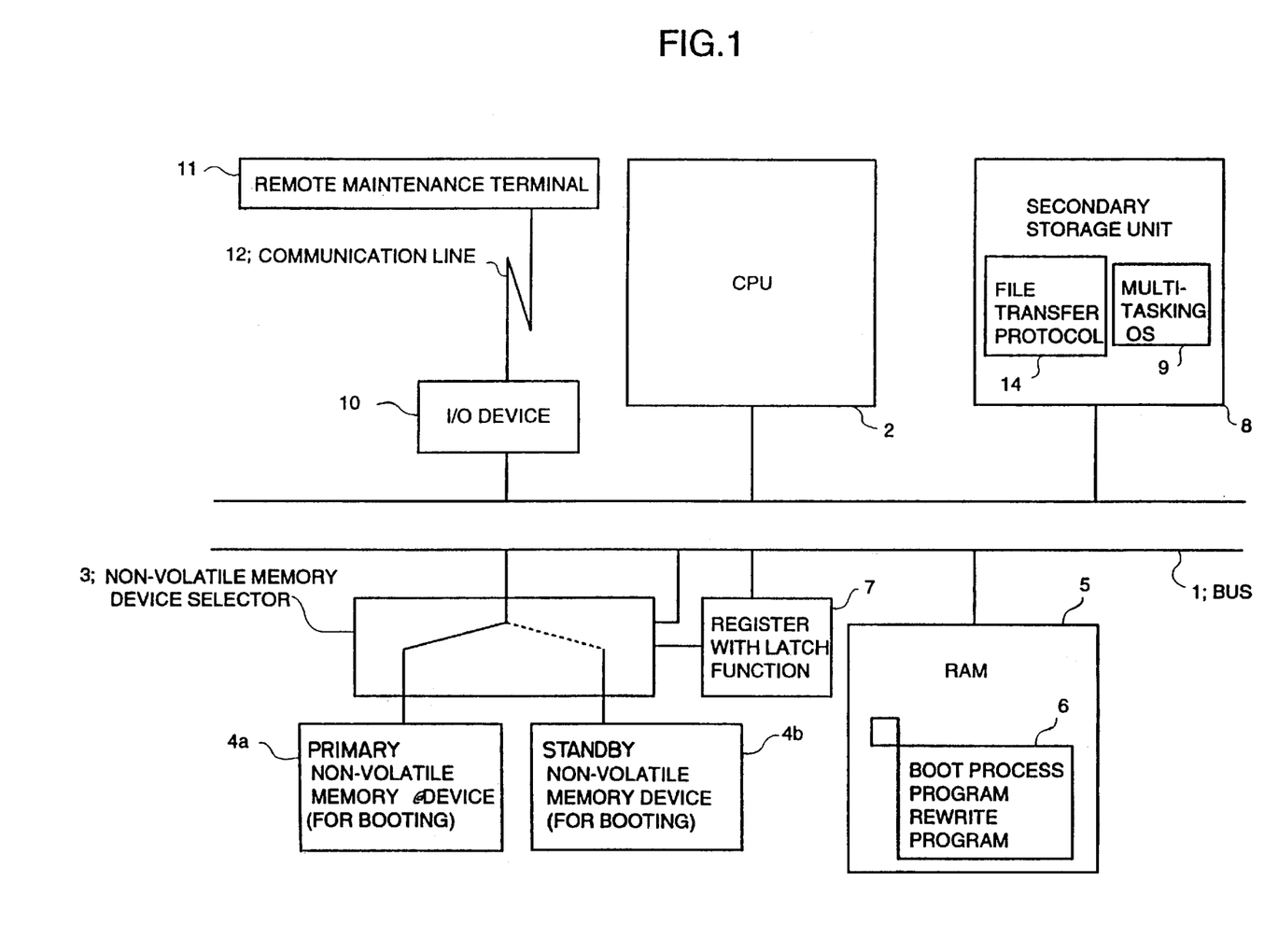
FIG. 1 is a block diagram showing the configuration of a computer system according to an embodiment of the present invention.

Furthermore, according to the present invention, the computer system includes at least two planes of non-volatile memory devices (4a and 4b in FIG. 1) and a non-volatile memory device selector that selects the two planes of non-volatile memory devices (3 in FIG. 1). Hence if it should fail to rewrite a BOOT process program in one plane of non-volatile memory device, the other plane of non-volatile memory device can execute a BOOT process.

According to the present invention, the computer system includes a multitasking OS (9 in FIG. 1) acting as OS of the computer system stored on the secondary storage unit (8 in FIG. 1) as well as a BOOT process program rewrite program (6 in FIG. 1) operated as one task on the multitasking OS. Hence the BOOT process program can be rewritten while the computer system is being operated.

Moreover, according to the present invention, since the computer system includes an interface that connects the input/output device (10 in FIG. 1) to the communication line (12 in FIG. 1), the computer system can be operated from remote sites. Since the computer system includes the file transfer protocol (14 in FIG. 1), rewrite information for the BOOT process program can be stored into the secondary storage unit (8 in FIG. 1) in the computer system by remote control.

According to the present invention, the computer system includes a register with latch function (7 in FIG. 1) that is rewritable by software and indicates a judgment condition to select the non-volatile memory device selector, thus recognizing the rewrite condition of the BOOT process program. Hence, even if a power supply should be stopped during a BOOT process program rewrite operation by remote control, the computer system can be started up by selecting a normal non-volatile memory device just upon resuming power supply

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, embodiments of the present invention will be described below in detail with reference to the attached drawings.

FIG. 1 is a block diagram showing the configuration of a computer system related to an embodiment of the present invention.

Referring to FIG. 1, the computer system related to an embodiment of the present invention includes a BUS 1 needed to operate the computer system, a CPU 2, a secondary storage unit 8, a multitasking OS 9 stored in the secondary storage unit 8, a RAM 5, a non-volatile memory device selector 3, and non-volatile memory devices 4a and 4b.

The CPU 2 operates the multitasking OS loaded from the secondary storage unit 8 to the RAM 5 and includes a BOOT process program rewrite program 6 running as one task on the multitasking OS.

In order to select a non-volatile memory device in which a normal BOOT process program is written, after a power supply failure during a BOOT process program rewriting operation, a register 7 with latch function is provided that can execute a rewrite operation by software and has a signal line in hardware form used as a selection judgment condition of the non-volatile memory device selector 3.

An input/output device 10 is connected to the bus 10 to connect the remote maintenance terminal 11 to the bus 10 via the communication line 12. A file transfer protocol 14 that stores BOOT process program rewrite information into the secondary storage unit 8 through manipulation from the remote maintenance terminal 11 is prepared on the secondary storage unit 8.

Next, the operation of the computer system related to an embodiment of the present invention will be described below.

Figure 2:
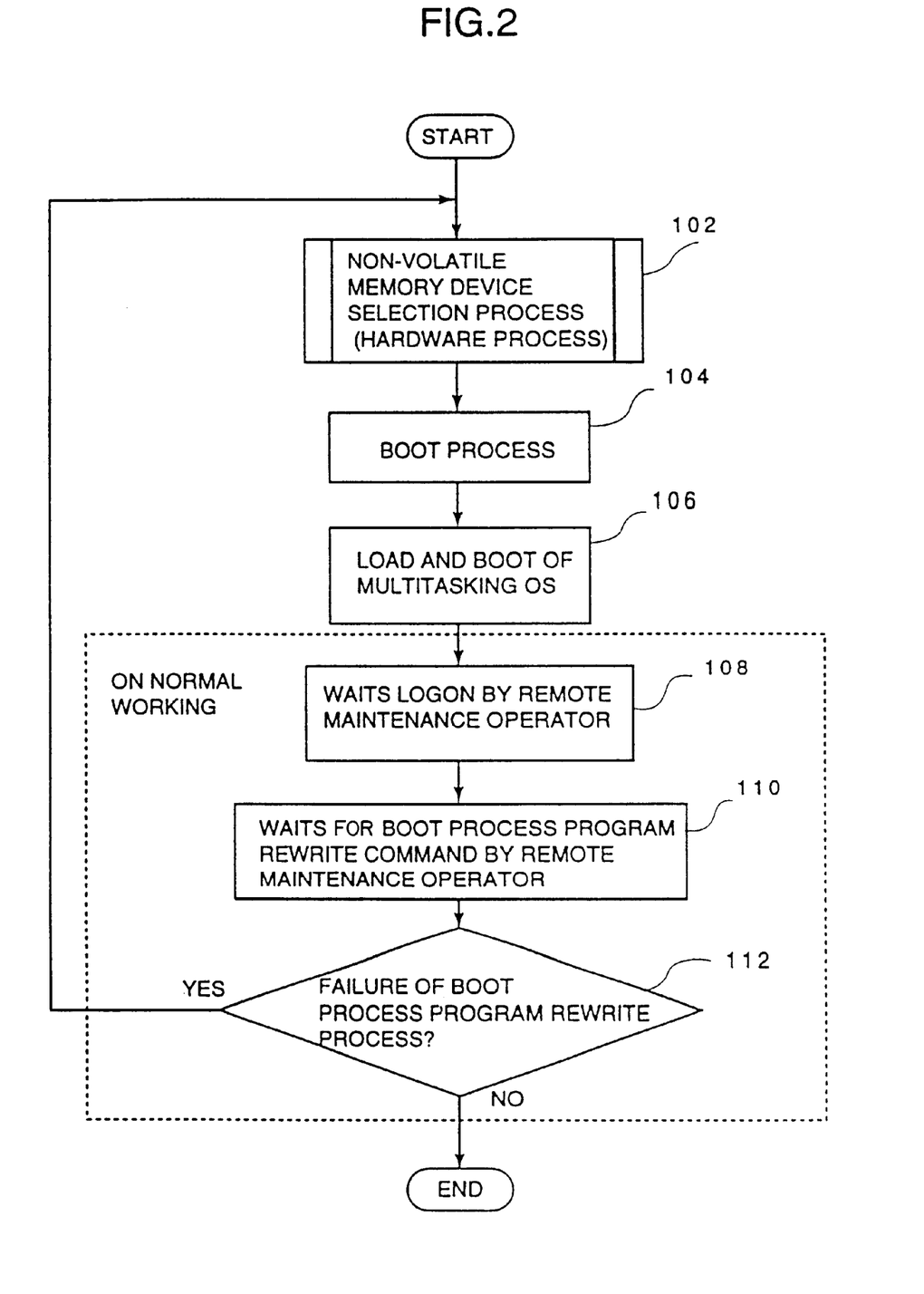
FIG. 2 is a flow chart showing the sequence ranging from a system set-up of a computer system to a rewrite operation of a BOOT process program in an embodiment of the present invention.
Figure 3:
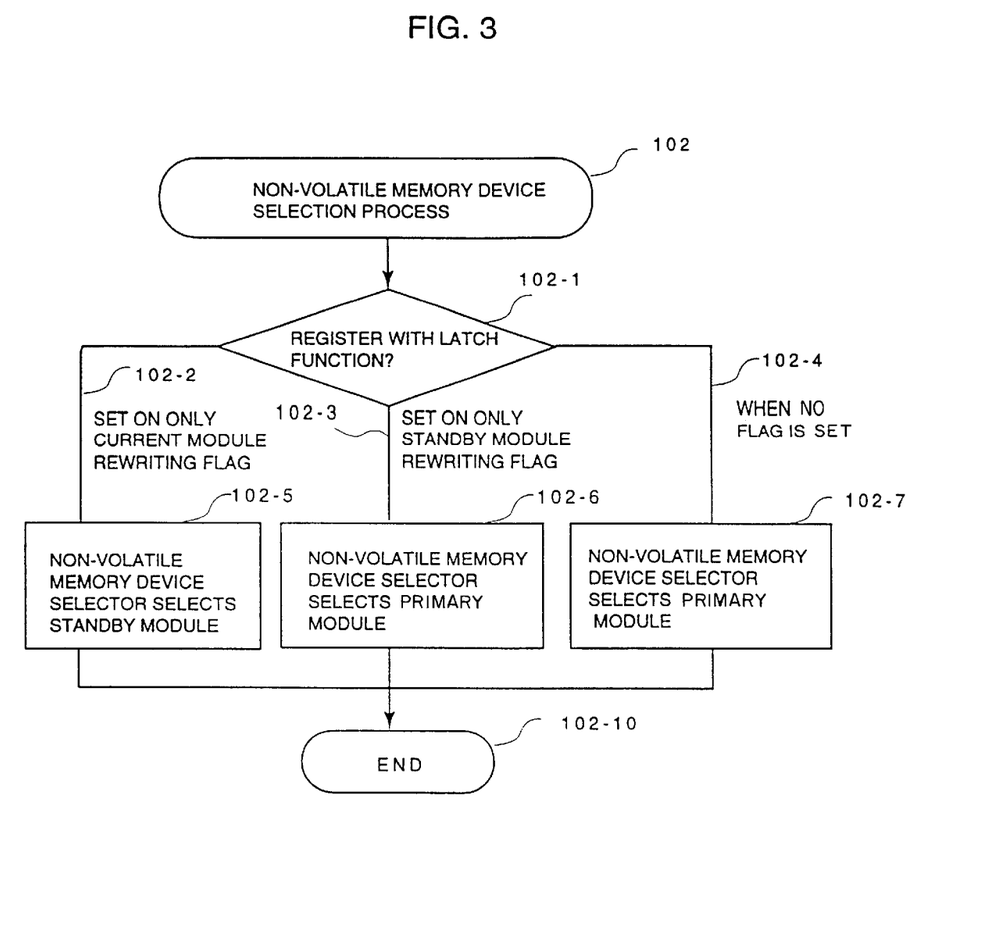
FIG. 3 is a flow chart showing the selection process sequence of a non-volatile memory device in the step 102 of the flow chart shown in FIG. 2.
Figure 4:
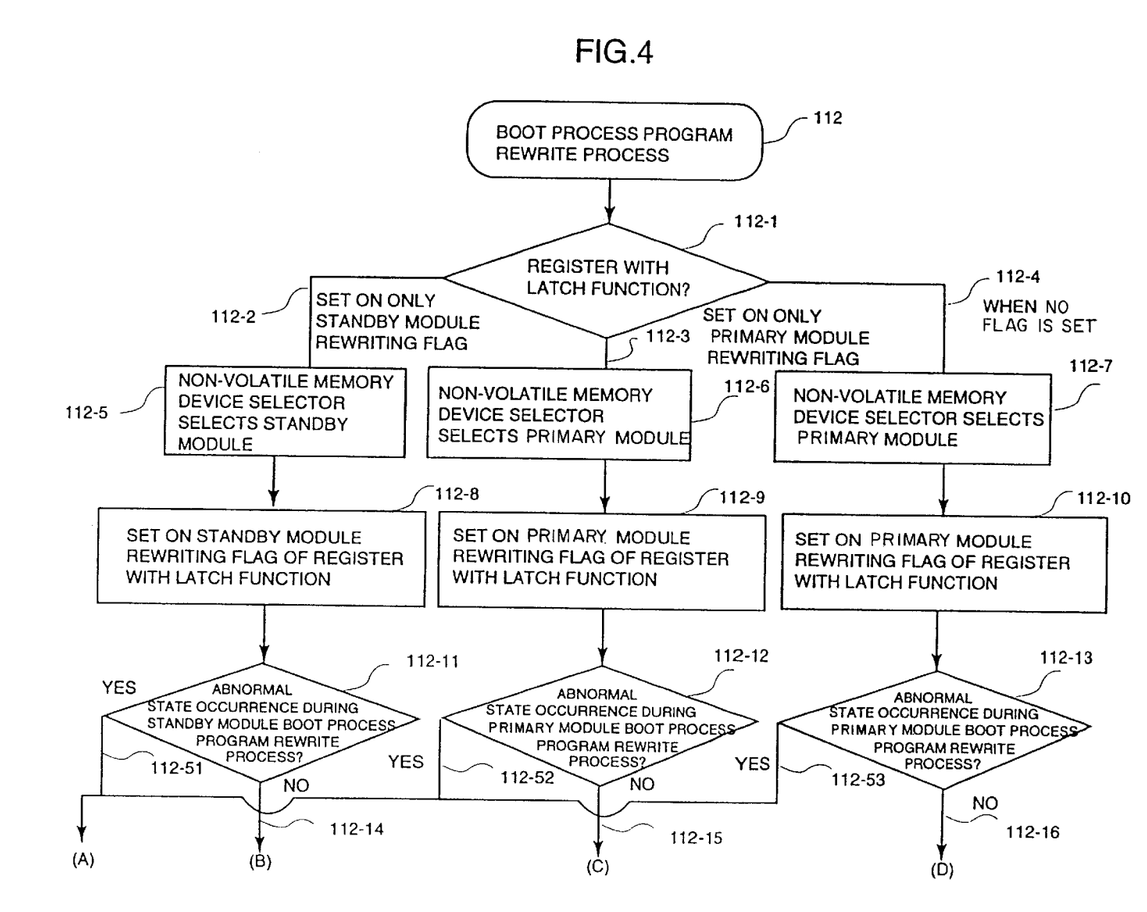
FIG. 4 is a flow chart showing the BOOT process program rewrite process sequence in the step 112 of the flow chart shown in FIG. 2 (corresponding to a complement diagram to FIG. 5)
Figure 5:
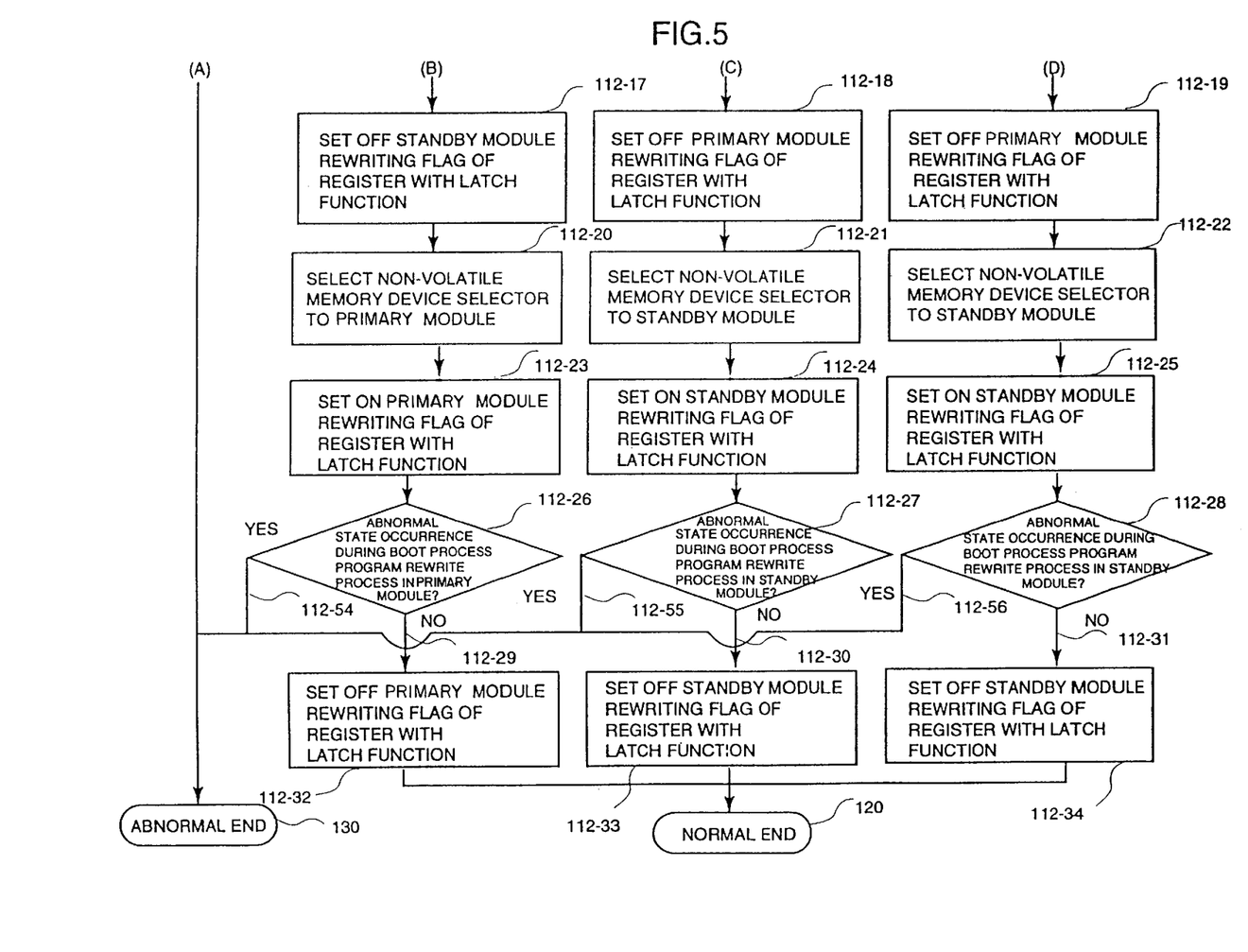
FIG. 5 is a flow chart showing the BOOT process program rewrite process sequence in the step 112 of the flow chart shown in FIG. 2 (corresponding to a complement diagram to FIG. 4)

FIG. 2 is a flow chart showing the procedure ranging from the system start-up to the BOOT process program rewrite operation in the computer system related to an embodiment of the present invention. FIG. 3 is a flow chart showing the procedure of the non-volatile memory device selecting process in the step 102 of the flow chart shown in FIG. 2. FIGS. 4 and 5 are flow charts each showing the procedure of the BOOT process program rewriting process in the step 112 of the flow chart shown in FIG. 2 (here, a complete flow chart is divided in two at the branches (A), (B), (C), and (D) due to a limitation in drawing and shown by FIGS. 4 and. 5).

Referring to FIGS. 1 to 4, the operation of the computer system related to an embodiment of the present invention will be described with seven operations including the operation 1 to the operation 7.

(Operation 1)

When the computer system is powered on, a non-volatile memory device in which a BOOT process program is written is selected to start up the computer system (step 102).

The flag of the register 7 with latch function in the step 102-1 is confirmed in the step 102-1. When values of two flags of the register 7 with latch register are "0" (step 102-4), the non-volatile memory device selector 3 first selects the primary non-volatile memory device 4a (step 102-7). The BOOT process program written in the primary non-volatile memory device 4a boots the computer system (step 104).

Thereafter, the multitasking OS 9 stored on the secondary storage unit 8 is loaded onto the RAM 5 and activated (step 106). These steps are similar to those in the conventional computer system.

In the following steps, the computer system executes processes according to the normal operations.

When a remote maintenance operator wants to rewrite the BOOT process program, he logs on the computer system using the remote maintenance terminal 11 connected to the computer system via the communication line 12 (step 108).

Then, a new BOOT process program is stored into the secondary storage unit 8 of the computer system from the remote maintenance terminal 11 via the communication line 12 using the file transfer protocol 14.

Thereafter, the remote maintenance operator issues a BOOT process program rewrite command (step 110), the BOOT process program rewrite program 6 is executed on the multitasking OS 9 (step 112).

Since two flags of the register 2 with latch function are "0" in the current state, the non-volatile memory device selector 3 selects the primary non-volatile memory device (step 112-7). Thereafter, the primary module rewriting flag of the register 7 with latch function is set ON to recognize the rewrite condition of the non-volatile memory device (step 112-10). Then the primary non-volatile memory device 4a is rewritten (step 112-13). If the primary non-volatile memory device 4a has been completely rewritten normally (step 112-16), the primary module rewriting flag of the register 7 with latch function is set OFF to indicate that the rewrite operation of the primary non-volatile memory device 4a has been normally completed (step 112-19).

Next, to rewrite the standby non-volatile memory device 4b, the non-volatile memory device selector 3 first selects the standby non-volatile memory device (step 112-22). Thereafter, a standby module rewriting flag of the register 7 with latch function is set ON to recognize the rewrite condition of the non-volatile memory device (step 112-25). Then, the non-volatile memory device 4b is rewritten (step 111-28). If the standby non-volatile memory device 4b has been completely rewritten (step 112-31), the standby module rewriting flag of the register 7 with latch function is set OFF to indicate that the standby non-volatile memory device 4b has been completely rewritten (step 112-34). Since the above-described steps can be executed in normal operation, thus not affecting the operation of the computer system.

(Operation 2)

Next, explanation will be made on a hypothetical operation where an abnormal state occurs during a rewriting process of the primary non-volatile memory device 4a in the step 112-13 of the operation (1) (step 112-53).

There are two kinds of abnormal state occurrence: one being the case where power supply is stopped during a rewriting process and the other being the case where a hardware failure occurs during a rewriting process. In either case, the computer system is reset.

Upon the reset operation, the non-volatile memory device selection process in the step 102 is performed by hardware. If a failure occurs in the step 112-13, the primary module rewriting flag of the register 7 with latch function set in the step 112-10 remains ON. Hence, in the process branched in the step 102-1, the step 102-2 is selected because the primary module rewriting flag is set ON. Here, since the primary non-volatile memory device 4a may cause a failure, the non-volatile memory device selector 3 selects the standby module (step 102-5).

Thereafter, the computer system starts up according to the BOOT process program written in the standby non-volatile memory device 4b (step 104). Then, the multitasking OS 9 stored on the secondary storage unit 8 is loaded onto the RAM 5 and started up (step 106). When confirming that operation of the computer system has been completely resumed, a remote maintenance crew first logs on the computer system using the remote maintenance terminal 11 connected to the computer system via the communication line 12 to rewrite the primary non-volatile memory device which currently includes its destroyed content (step 108).

A new BOOT process program is stored into the secondary storage unit 8 of the computer system from the remote maintenance terminal 11 via the communication line 12 through the use of the file transfer protocol 14.

Thereafter, when the remote maintenance crew issues the BOOT process program rewrite program (step 110), the BOOT process program rewrite program 6 are executed on the multitasking OS 9 (step 112).

Since only the primary module rewriting flag of two flags of the register 7 with latch function is set ON in the current state (step 112-3), the non-volatile memory device selector 3 selects the primary module (step 112-6). Thereafter, the primary module rewriting flag of the register 7 with latch function is set ON so as to recognize the rewrite state of the non-volatile memory device (step 112-9). Then the non-volatile memory device 4a in the primary module is rewritten (step 112-12). When the rewrite operation of the primary non-volatile memory device 4a has been normally completed (step 112-15), the primary module rewriting flag of the register 7 with latch function is set OFF to indicate that the rewrite operation has been normally completed (step 112-18).

Next, to rewrite the standby non-volatile memory device 4b, the non-volatile memory device selector 3 first selects the standby module (step 112-21). Thereafter, the standby module rewriting flag of the register 7 with latch function is set ON to recognize the rewrite state of the non-volatile memory device (step 112-24). Then, the standby non-volatile memory device 4b the is rewritten (step 112-27). When the rewrite operation of the standby non-volatile memory device 4b has been normally completed (step 112-30), the standby module rewriting flag of the register 7 with latch function is set OFF to indicate that the standby non-volatile memory device 4b has been normally rewritten (step 112-33).

(Operation 3)

Next, explanation will be made of a hypothetical operation where an abnormal state occurs during a rewriting process of the standby non-volatile memory device 4b in the step 112-28 of the operation (1) (step 112-56).

There are two kinds of abnormal occurrence, as described in the operation (2). In either case, the computer system is reset.

Upon the reset operation, the non-volatile memory device selection process in the step 102 is performed by hardware. If a failure occurs in the step 112-28, the standby module rewriting flag of the register 7 with latch function set in the step 112-25 remains ON. Hence, in the process branched in the step 102-1, the step 102-3 is selected because the standby module rewriting flag is set ON. Here, since the standby non-volatile memory device 4b may cause a failure, the non-volatile memory device selector 3 selects the primary module (step 102-6).

Thereafter, the computer system starts up according to the BOOT process program written in the non-volatile memory device 4a in the primary module (step 104). Then, the multitasking OS 9 stored on the secondary storage unit 8 is loaded onto the RAM 5 and started up (step 106). When confirming that operation of the computer system has been completely resumed, a remote maintenance operator first logs on the computer system using the remote maintenance terminal 11 connected to the computer system via the communication line 12 to rewrite the standby non-volatile memory device 4b which currently includes its destroyed content (step 108).

A new BOOT process program is stored into the secondary storage unit 8 of the computer system from the remote maintenance terminal 11 via the communication line 12 through the use of the file transfer protocol 14.

Thereafter, when the remote maintenance operator issues the BOOT process program rewrite program (step 110), the BOOT process program rewrite program 6 is executed on the multitasking OS 9 (step 112).

Since only the standby module rewriting flag of two flags of the register 7 with latch function is set ON in the current state (step 112-2), the non-volatile memory device selector 3 selects the standby non-volatile memory device (step 112-5). Thereafter, the standby module rewriting flag of the register 7 with latch function is set ON so as to recognize the rewrite state of the non-volatile memory device (step 112-8). Then the standby non-volatile memory device 4b is rewritten (step 112-11). When the rewrite operation of the standby non-volatile memory device 4b has been normally completed (step 112-14), the standby module rewriting flag of the register 7 with latch function is set OFF to indicate that the rewrite operation has been normally completed (step 112-17).

Next, to rewrite the primary non-volatile memory device 4a, the non-volatile memory device selector 3 first selects the current module (step 112-20). Thereafter, the current module rewriting flag of the register 7 with latch function is set ON to recognize the rewrite state of the non-volatile memory device (step 112-23). Then, the primary non-volatile memory device 4a is rewritten (step 112-26). When the rewrite operation of the primary non-volatile memory device 4a has been normally completed (step 112-29), the current module rewriting flag of the register 7 with latch function is set OFF to indicate that the primary non-volatile memory device 4a has been normally rewritten (step 112-32).

(Operation 4)

In the procedure of the operation (2), the hypothetical operation where an abnormal state occurs during a rewriting process of the primary non-volatile memory device 4a in the step 112-12 (step 112-52) is identical to that in the operation (2). Hence the steps in the operation (2) are repeated.

(Operation 5)

In the procedure of the operation (2), the hypothetical operation where an abnormal state occurs during a rewriting process of the standby non-volatile memory device 4b in the step 112-27 (step 112-55) is identical to that in the operation (3). Hence the steps in the operation (3) are repeated.

(Operation 6)

In the procedure of the operation (3), the hypothetical operation where an abnormal state occurs during a rewriting process of the standby non-volatile memory device 4b in the step 112-11 (step 112-51) is identical to that in the operation (3). Hence the steps in the operation (3) are repeated.

(Operation 7)

In the procedure of the operation (3), the hypothetical operation where an abnormal state occurs during a rewriting process of the primary non-volatile memory device 4a in the step 112-26 (step 112-54) is identical to that in the operation (2). Hence the steps in the operation (2) are repeated.

Next, an embodiment of the present invention will be specifically described below.

According to an embodiment of the present invention, FEPROMs (Flash EPROMs) are preferably used as the non-volatile memory devices 4a and 4b. The FEPROM can rewrite its stored content according to a fixed sequence using a software. Since the stored content is not erased even in the case of no power supply, the foregoing processes according to an embodiment of the present invention can be realized.

In addition, memory devices such as SRAM (Static RAMs), EEPROMs (Electric EPROMs), and the like may be preferably used as the non-volatile memory devices 4a and 4b.

Furthermore, according to an embodiment of the present invention, multiuser/multitasking OS such as UNIX can be used as the multitasking OS 9. In that case, the BOOT process program rewrite program 6 can be operated in the background.

As described above, according to the present invention, the software rewritable non-volatile memory device can be rewritten using the BOOT process program rewrite program. Hence, even if there is a bug in the BOOT process program, the BOOT process program can be rewritten without sustaining the operation of the computer system and opening the cabinet of the computer system.

Moreover, according to the present invention, two planes of non-volatile memory devices are prepared for the booting process and the writing operation can be performed plane by plane. Hence, even if a rewriting operation is failed due to power-down during the rewriting of one non-volatile memory device, the BOOT process program can be safely rewritten because the other non-volatile memory device includes always a normal BOOT process program.

Furthermore, according to the present invention, the remote maintenance terminal can be connected to the computer system via the communication line so that the BOOT process program rewrite information can be transferred from a remote site to the secondary storage unit of the computer system, using a file transfer protocol. Hence, the above-mentioned advantages allow the BOOT process program to be rewritten by remote control.

The entire disclosure of Japanese Patent Application No. 8-195296 filed on Jul. 5, 1996 including specification, claims, drawing and summary are incorporated herein by reference in its entirety.

What is claimed is:

1. A multitasking computer system comprising:
   at least two planes of non-volatile memory devices each storing a boot process program that is rewritable by software,
   a multitasking operating system for operating plural tasks,
   a boot process program rewriting program for operating as one of tasks of said multitasking operating system
   a register having a latch function for storing data representing respective rewrite states of each of said boot process programs such that data indicating rewriting of a boot process program is stored when the rewriting of the boot process program is begun and is retained in storage unless it is determined that the rewriting of the boot process program is successfully completed, the register thereby indicating rewriting of a boot process program in the event of a failure during rewriting of the boot process program, and a non-volatile memory device selector for selecting one of said non-volatile memory devices to provide a non-corrupted boot process program for booting the system based on boot process program rewrite states stored in the register.

2. The computer system of claim 1, further comprising:

an input/output device for connecting via a remote maintenance terminal and a communication line, and a file transfer protocol for transferring rewrite information of a boot process program via said communication line, whereby a boot process program can be remotely rewritten during operation of the computer system.

3. The computer system of claim 2, wherein said register includes at least a first flag for indicating the rewrite state of a primary non-volatile memory device and a second flag for indicating the rewrite state of a standby non-volatile memory device, wherein the flags of the register are rewritable by software, and wherein the register is directly connected to a signal line in hardware to provide automatic discrimination when said non-volatile memory device selector is powered on.

4. The computer system of claim 1, wherein said register includes at least a first flag for indicating the rewrite state of a primary non-volatile memory device and a second flag for indicating the rewrite state of a standby non-volatile memory device, wherein the flags of the register are rewritable by software, and wherein the register is directly connected to a signal line in hardware to provide automatic discrimination when said non-volatile memory device selector is powered on.

5. A multitasking computer system having a boot process rewrite program, comprising:

an input/output device for connecting a remote maintenance terminal to the computer system, a communication line, a primary non-volatile memory device storing a boot process program that is rewritable by software, a standby non-volatile memory device storing a boot process program that is rewritable by software, a first storage means storing a multitasking operating system for operating plural tasks, a second storage means storing a boot process program rewrite program for operating as one of tasks of said multitasking operating system, a third storage means storing a file transfer protocol for transferring information for remotely rewriting said boot process program during operation of said computer system via said communication line, a register having a latch function for storing data representing respective rewrite states of each of said boot process programs such that data indicating rewriting of a boot process program is stored when the a rewriting of the boot process program is begun and is retained in storage unless it is determined that the rewriting of the boot process program is successfully completed, the register including at least a first flag for indicating a rewrite state of the boot process program of the primary non-volatile memory device and a second flag for indicating a rewrite state of the boot process program of the standby non-volatile memory device, wherein the flags of the register are rewritable by software, wherein the register is directly connected to a signal line in hardware to provide automatic discrimination when said non-volatile memory device selector is powered on, and wherein the register retains stored rewrite states for each of the two non-volatile memory devices in the event of a failure of a boot rewrite process program, and a non-volatile memory device selector for selecting one of said non-volatile memory devices for providing a non-corrupted boot process program for booting the system based on boot process rewrite states stored in the register.

6. A method of rewriting a boot process program during operation in a computer system, said computer system including at least two planes of non-volatile memory devices that are rewritable by software and each storing a boot process program, a multitasking operating system for operating plural tasks, a register having a latch function for storing data representing respective rewrite states of each of said boot process programs such that data indicating rewriting of a boot process program is stored when rewriting of the boot process program is begun and is retained in storage unless it is determined that the rewriting of the boot process program is successfully completed, the register thereby indicating rewriting of a boot process program in the event of a failure during rewriting of the boot process program, a non-volatile memory device selector for selecting one of said non-volatile memory devices to provide a non-corrupted boot process program for booting the system based on boot process program rewrite states stored in the register, and a boot process rewrite program for operating as one of tasks of said multitasking operating system and for selecting a boot process program for rewriting based on values stored in the register, the method comprising the steps of:

logging on said computer system using a remote maintenance terminal, storing a new boot process program into a secondary storage unit from said remote maintenance terminal using a file transfer protocol, and executing said boot process program rewrite program on a multitasking OS when a boot process program rewrite command is issued to rewrite a boot process program selected based on boot process program rewrite states stored in the register.

* * * * *